United States Patent
Wei, III et al.

(10) Patent No.: US 9,494,699 B2
(45) Date of Patent: Nov. 15, 2016

(54) DEVICES AND SYSTEMS FOR CONTROLLING HARMONIC DISTORTION IN SEISMIC SOURCES

(71) Applicant: INOVA, LTD., Grand Cayman (KY)

(72) Inventors: Zhouhong Wei, III, Sugar Land, TX (US); Thomas F. Phillips, Richmond, TX (US)

(73) Assignee: INOVA, Ltd., Houston, TX (US)

( * ) Notice: Subject to any disclaimer, the term of this patent is extended or adjusted under 35 U.S.C. 154(b) by 850 days.

(21) Appl. No.: 13/856,528

(22) Filed: Apr. 4, 2013

(65) Prior Publication Data

US 2013/0264141 A1 Oct. 10, 2013

Related U.S. Application Data

(60) Provisional application No. 61/620,247, filed on Apr. 4, 2012.

(51) Int. Cl.
*G01V 1/04* (2006.01)
*G01V 1/143* (2006.01)
*G01V 1/155* (2006.01)
*G01V 1/133* (2006.01)
*G01V 1/00* (2006.01)

(52) U.S. Cl.
CPC .............. *G01V 1/133* (2013.01); *G01V 1/005* (2013.01); *G01V 1/143* (2013.01); *G01V 1/155* (2013.01)

(58) Field of Classification Search
CPC ................................. G01V 1/04; G01V 1/155
USPC .................................................. 367/189–190
See application file for complete search history.

(56) References Cited

U.S. PATENT DOCUMENTS

| | | |
|---|---|---|
| 4,147,228 A | 4/1979 | Bouyoucos |
| 4,637,002 A | 1/1987 | Sallas |
| 4,982,374 A | 1/1991 | Edington et al. |
| 5,128,908 A | 7/1992 | Reust |
| 6,035,257 A | 3/2000 | Epperson |
| 6,161,076 A | 12/2000 | Barr et al. |
| 6,865,488 B2 | 3/2005 | Moerig et al. |
| 7,974,152 B2 | 7/2011 | Tenghamn |
| 7,974,154 B2 | 7/2011 | Bagaini et al. |
| 8,134,891 B2 | 3/2012 | Wei et al. |
| 8,462,588 B2 | 6/2013 | Sitton et al. |
| 8,462,589 B2 | 6/2013 | Sitton et al. |
| 8,559,275 B2 * | 10/2013 | Sallas ........................... 367/189 |
| 2011/0164470 A1 | 7/2011 | Wei et al. |

OTHER PUBLICATIONS

PCT/US2013/035247—International Search Report dated Apr. 15, 2013.
Wei et al., "Harmonic Distortion Reduction on Seismic Vibrators", The Leading Edge 29, No. 3, Mar. 2010: 256-261, Fig. 1, 3-4, 8, pp. 256-260.

* cited by examiner

*Primary Examiner* — Ian J Lobo
(74) *Attorney, Agent, or Firm* — Mossman, Kumar & Tyler, PC

(57) ABSTRACT

A seismic source signal apparatus for generating a seismic source signal may include a seismic source component for coupling a reaction mass to the earth; a controllable valve operatively connected to the seismic source component; and a controller controlling the controllable valve with a primary control signal generated by using a model of a response of the controllable valve over a selected operating range. The model is used to reduce nonlinearity in flow versus displacement response of the controllable valve.

19 Claims, 6 Drawing Sheets

DEVICES AND SYSTEMS FOR CONTROLLING HARMONIC DISTORTION IN SEISMIC SOURCES

CROSS-REFERENCE TO RELATED APPLICATIONS

This application claims priority from U.S. Provisional Application Ser. No. 61/620,247 filed Apr. 4, 2012, the disclosure of which is fully incorporated herein by reference in its entirety.

BACKGROUND OF THE DISCLOSURE

1. Field of the Disclosure

The present disclosure generally relates to seismic prospecting and in particular to methods and apparatus for generating seismic source signals with enhanced seismic frequency sweeps.

2. Description of the Related Art

In the oil and gas exploration industry, geophysical tools and techniques are commonly employed in order to identify a subterranean structure having potential hydrocarbon deposits. Many different techniques are used to generate a seismic signal.

Seismic vibratory energy sources have been used in the field many years. A seismic vibrator in its simplest form is merely a heavy vehicle that has the ability to shake the ground at a predetermined range of frequencies of about 2 to 100 Hz. The vibrator imparts a signal into the subsurface of the earth over a relatively long period of time, which allows for an energy level less than impulse generators such as dynamite.

The imparted energy, known as the seismic source signal or "pilot" signal, travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the subsurface.

The seismic vibrator source signal is typically a sweep signal, or simply sweep. Sweeps are sinusoidal vibrations in the 2-100 Hz range described above and having a duration on the order of 2 to 20 seconds depending on the terrain, the subsurface lithology, economic constraints and physical capabilities of the vibrator. The sinusoidal sweep can be increased in frequency over time, which is called an "upsweep." The upsweep is the signal used typically in modern seismic exploration. Also, the sinusoidal sweep can be decreased in frequency overtime, which is called a "downsweep." The end products of the vibrator sweep are waves that propagate through the earth to return clues about the subsurface.

The present disclosure provides methods and devices for enhancing seismic sweeps.

SUMMARY OF THE DISCLOSURE

In aspects, the present disclosure provides a method for generating seismic signals with seismic source that is operatively connected to a controllable valve. The method may include generating a primary control signal using a model of a response of the controllable valve over a selected operating range, wherein the model is used to reduce a nonlinearity in flow versus displacement response of the controllable valve; and transmitting the primary control signals to the controllable valve to generate the seismic signals with the seismic source.

In aspects, the present disclosure also provides a seismic source signal apparatus for generating a seismic source signal. The apparatus may include a seismic source component for coupling a reaction mass to the earth; a controllable valve operatively connected to the seismic source component; and a controller controlling the controllable valve with a primary control signal generated by using a model of a response of the controllable valve over a selected operating range, wherein the model is used to reduce a nonlinearity in flow versus displacement response of the controllable valve.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Modern seismic vibrators typically consist of a hydromechanical reaction mass system that is driven by a controllable valve such as an electronically controlled servo-valve assembly. The control electronics output sweep signals as commands to drive the servo-valve assembly. In response, the servo-valve assembly outputs a high pressure hydraulic oil flow. This high pressure flow is fed alternately into upper and lower chambers in the reaction mass to create a differential pressure. This differential pressure drives the reaction mass up and down to generate the reaction-mass force. Meanwhile, this reaction-mass force is equally and oppositely applied to a vibrator baseplate and radiated into the ground as the vibrator ground force. In this system, the servo-valve assembly acts as an amplifier that amplifies a small controllable current into a large differential pressure. At the same time, nonlinear dynamics in the servo-valve assembly may also become amplified and appear as harmonic distortions in the differential pressure of the reaction-mass force. Aspects of the present disclosure enable extending the Vibroseis bandwidth toward low frequencies (below 10 Hz) by using harmonic distortion reduction (HDR) controls that improve vibrator performance. While harmonic distortion reduction may be obtained through the entire band of sweep frequencies, such reductions may be most pronounced at low frequencies.

Figure 1:
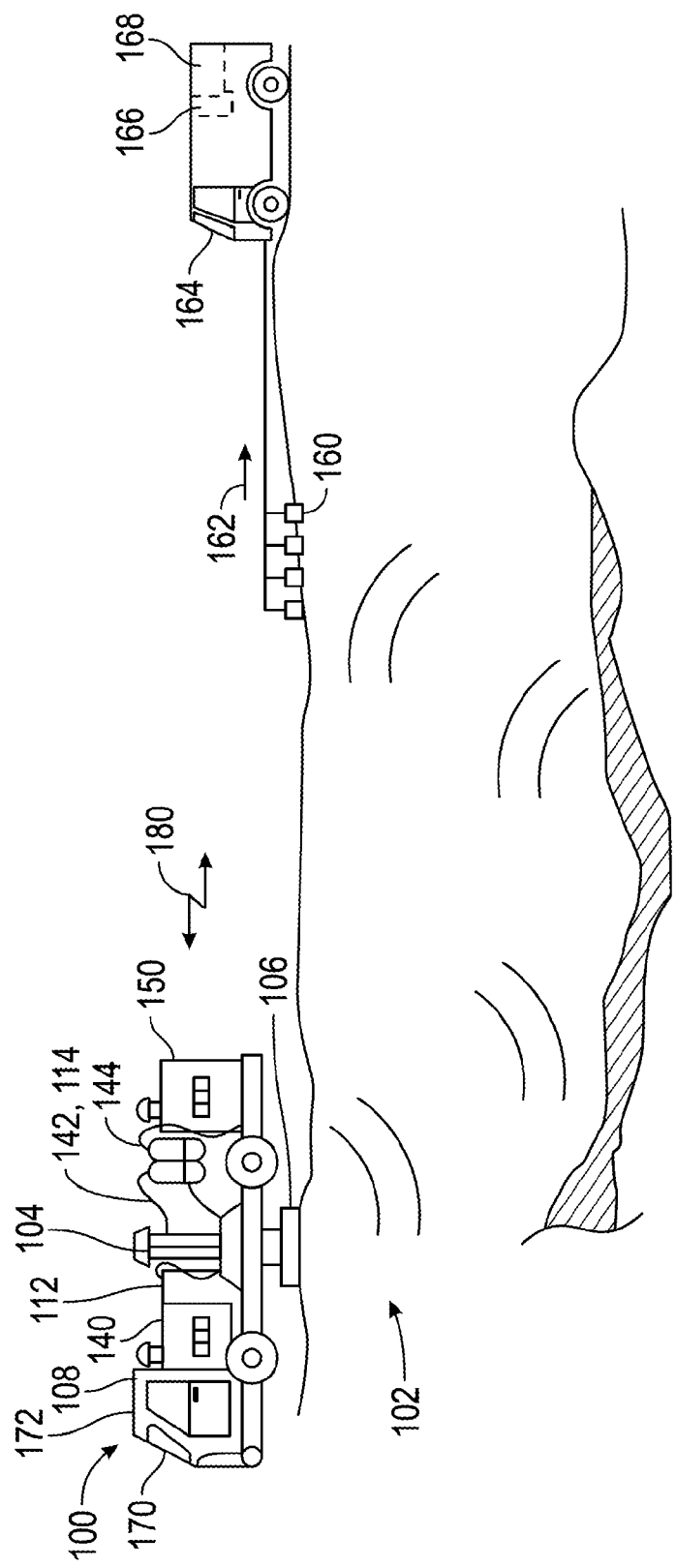
FIG. 1 illustrates a typical seismic data acquisition operation utilizing aspects of the present disclosure.

FIG. 1 depicts a geophysical survey layout that may use HDR controls developed in accordance with embodiments of the present disclosure. A seismic source 100 is positioned at a predetermined location in an area of exploration and coupled to the earth. In the embodiment shown the seismic source 100 is a truck-carried vibratory seismic source. The vibratory seismic source 100 may be a single axis source imparting, for example, only compression P-waves into the earth. Those skilled in the art would recognize that a multi-axis vibratory source capable of imparting both P and S waves into the earth can be configured according to the present disclosure described in detail herein below without additional illustration or description. Therefore, the present disclosure will focus on a single axis seismic source for brevity and without limiting the scope of the disclosure.

The seismic source 100 includes a truck 170 having a cab 172 housing a controller 108. The seismic source includes a hydraulic subsystem 140 used to move a reaction mass 104. As will be described in more detail in reference to FIG. 2, the moving reaction mass 104 acts upon a base plate 106 to impart a seismic source signal 102 into the earth. The signal 102 travels through the earth, reflects at discontinuities and formations, and travels toward the earth's surface.

A plurality of sensors 160 are coupled to the earth in an array spaced apart from the seismic source 100. The sensors 160 detect the reflected source signal 102, and electrical signals 162, which may be digital and/or analog, are transmitted from the array of sensors 160 to a recording station (not shown) typically housed in a truck. The recording station includes a seismic recorder 168 and may also include a correlation processor, which also receives an electrical signal 180 indicative of the actual source signal 102 imparted into the earth.

Still referring to FIG. 1, the seismic source 100 comprises several subsystems having system components used in generating the seismic signal 102. The system 100 includes a hydraulic pump subsystem 140 having hydraulic lines 142 carrying hydraulic fluid 114 to a controllable valve such as a servo valve assembly 112. A cooler 150 is typically present to cool the hydraulic subsystem. Low frequency accumulators 144 mounted on the truck are relatively large, e.g. about ten gallons or more, and serve to dampen low frequency noise, e.g. about 25 Hz or less, caused by operation of the hydraulic system.

Figure 2:
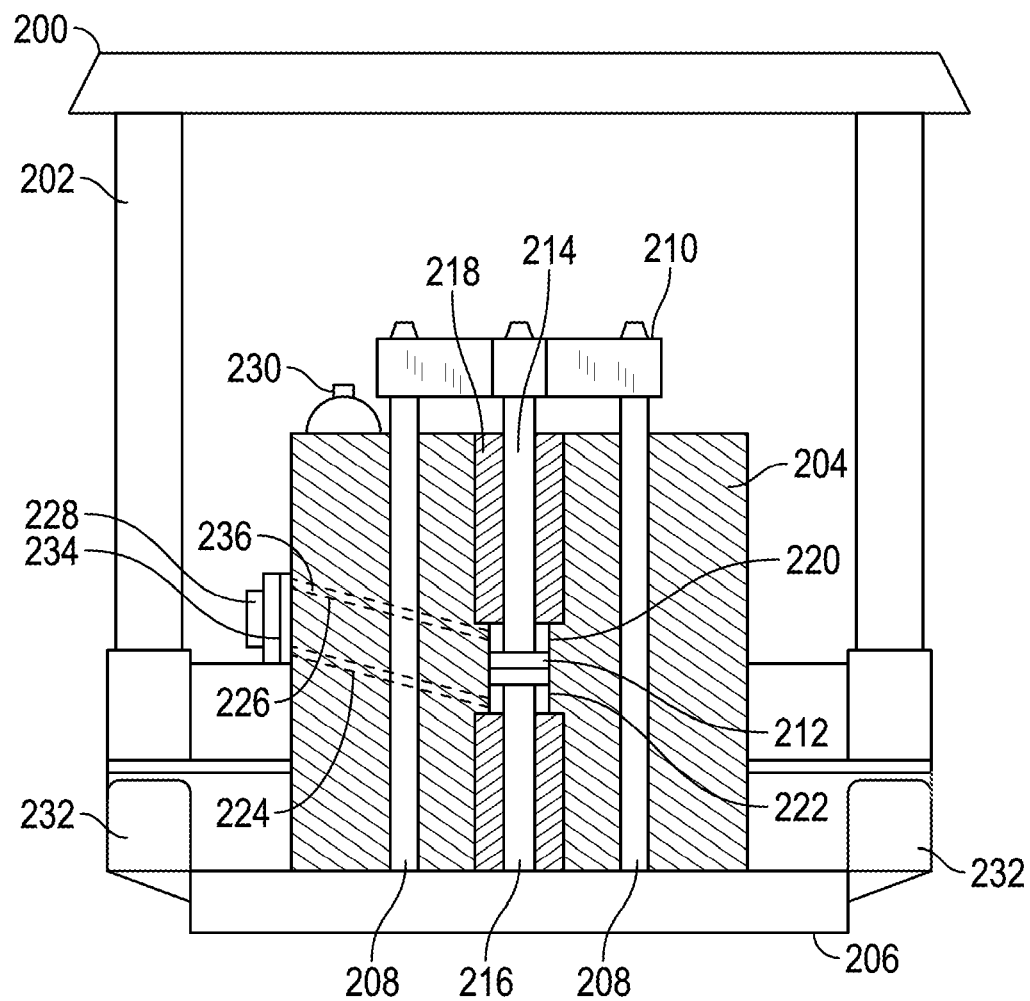
FIG. 2 is an elevation view in cross section of a vibratory source.

FIG. 2 is an elevation view in cross section of a vibratory seismic signal source 200 similar to the source 100 described above and shown in FIG. 1. The vibratory seismic signal source, or simply source 200, may be carried on a vehicle such as the truck 170 described above and shown in FIG. 1. The source 200 includes a lift mechanism assembly 202, a moveable mass 204 and a base plate 206. The mass 204 and base plate 206 may each be constructed substantially from a metal such as steel or iron. Those skilled in the art are versed in the general materials of construction, so a detailed materials list is not necessary here. The lift mechanism assembly 202 may be hydraulic, mechanical, electromechanical or any mechanism assembly useful for lowering and raising the base plate 206 to engage and disengage the ground.

A stilt structure 208 extends from the base plate 206 through the mass 204. A cross piece 210, which may be constructed from steel or iron I-beam, is coupled to a top section of the stilt structure to provide stability to the stilt structure as the mass 204 vibrates. The stilts may be tubular pipes made of steel or iron, although other shapes may be used.

A piston 212 includes opposing piston rods 214, 216 extending through the mass 204. The upper rod 214 being coupled to a hub in the cross piece 210 and the lower rod being coupled to a hub in the base plate 206. The piston 212 is slidably received in a cylinder 218 extending vertically through the mass 204. Upper and lower annular chambers 220, 222 are located immediately above and below the piston 212 and around the upper and lower piston rods 214, 216. Hydraulic fluid passages 224, 226 lead from respective chambers 220, 222 to a servo-valve assembly 228 mounted on an exterior surface of the mass 204. Alternatively, a ported spacer 234 may be mounted between the mass 204 and servo-valve assembly 228. Supply and return hydraulic lines (FIG. 1 at 142) couple the servo-valve assembly 224 and one or more small accumulators 230, which are mounted on the mass 204 close to the servo-valve assembly 228, to a hydraulic pump subsystem 140 described above and shown in FIG. 1. A pair of high frequency accumulators 230 are mounted as close as practicable to the servo-valve assembly has been found to aid in seismic source signal noise reduction. High frequency accumulators 230 relatively small, e.g. about five gallons or less, and serve to dampen high frequency noise, e.g. about 25 Hz or more, caused by operation of the servo-valve assembly 228. Pressure sensors 236 are used to measure supply hydraulic pressure, return hydraulic pressure, and hydraulic pressure to/from hydraulic passageways 224, 226 for use at least in part for control algorithms and methods according to the disclosure.

Hydraulic fluid 114 pumped to and from the cylinder chambers 220, 222 causes the mass 204 to reciprocally vibrate in a vertical direction. The force generated by the vibrating mass is transferred to the base plate 206 via the stilt structure 208 and lower piston rod 216. The vibration force is isolated from the vehicle by use of isolators 232 known in the art. The number and position of isolators are determined in part by the shape of the base plate.

Figure 3:
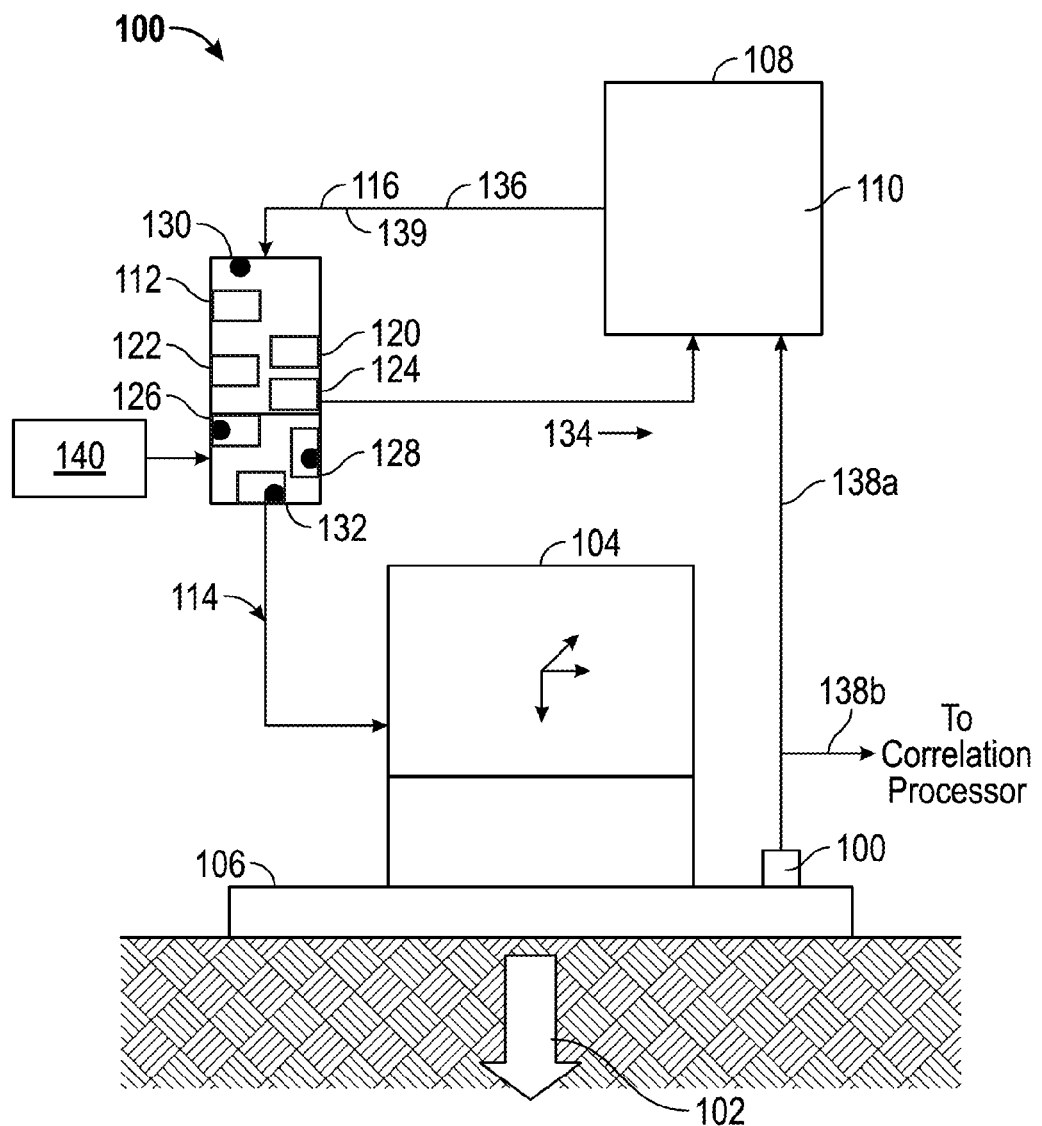
FIG. 3 is a schematic representation of functional features of a vibratory seismic source such as the source of FIG. 1.

FIG. 3 schematically illustrates a seismic signal generating system 100 substantially as described above and shown in FIGS. 1 and 2, useful for imparting a sinusoidal seismic signal 102 into the earth. Reference numerals are aligned with the like components of FIG. 1, but the schematically-illustrated components of FIG. 3 are also applicable to similar elements shown on FIG. 2 having different reference numerals, which are provided parenthetically below for clarity. The base plate 106 (206) is coupled via static weight to the earth. The reaction mass 104 (204) is movably coupled to the base plate 106 (206) such that controlled movement of the reaction mass 104 (204) via the hydraulic subsystem 140 vibrates the base plate 106 (206) at a desired amplitude and frequency or sweep to generate the signal 102. The controller 108 includes a processor 110 for controlling the system 100. The controller is electrically coupled to the servo valve assembly 112 (228). The servo valve assembly 112 (228) includes a servo motor 120, a pilot valve 122 and a main stage valve 124.

The servo valve assembly 112 (228) controls fluid movement in the hydraulic subsystem 140, which provides a force for moving the reaction mass 104 (204). An electrical signal 116 having characteristics of the desired sweep signal is transmitted from the controller 108 to the servo motor, which operates the pilot valve 122. The pilot valve 122 is coupled to the main stage valve 124 and includes a hydraulic coupling for transferring hydraulic pressure to operate the main stage valve. When operated, the main stage valve pressurizes and depressurizes hydraulic passages 226, 224 to move the reaction mass 104 (204) according to the controller signal. High frequency accumulators 230 reduce or remove servo-valve harmonic distortion of frequencies of about 25 Hz or more, typically 25-30 Hz.

One illustrative control algorithm for generating the primary control signal 116 according to an aspect of the disclosure is:

$$Q_L = KX_V \sqrt{P_s - \frac{X_V}{|X_V|} P_L}$$

where:
Q=Hydraulic flow through the servo valve;
K=Hydraulic flow gain;
$X_v$=Servo Valve displacement;
$P_S$=Hydraulic fluid supply pressure, which comprises $P_H$-$P_R$; and
$P_L$=Hydraulic differential pressure, which comprises control pressures $P_A$-$P_B$.

The servo-valve control algorithm of this equation is used to further regulate the servo-valve assembly 112 (228) by considering process feedback signals from the torque motor current sensor 134 and the main stage valve position indicator 136.

The servo valve assembly 112 (228) may exhibit nonlinearities during operation, which generate harmonic distortions in the acoustic signal imparted to the earth. Among these nonlinearities, the servo-valve characteristics near a null and the servo-valve nonlinear flow-pressure characteristics may be significant sources that cause the system 100 to produce undesirable harmonics at low frequencies.

Figure 4:
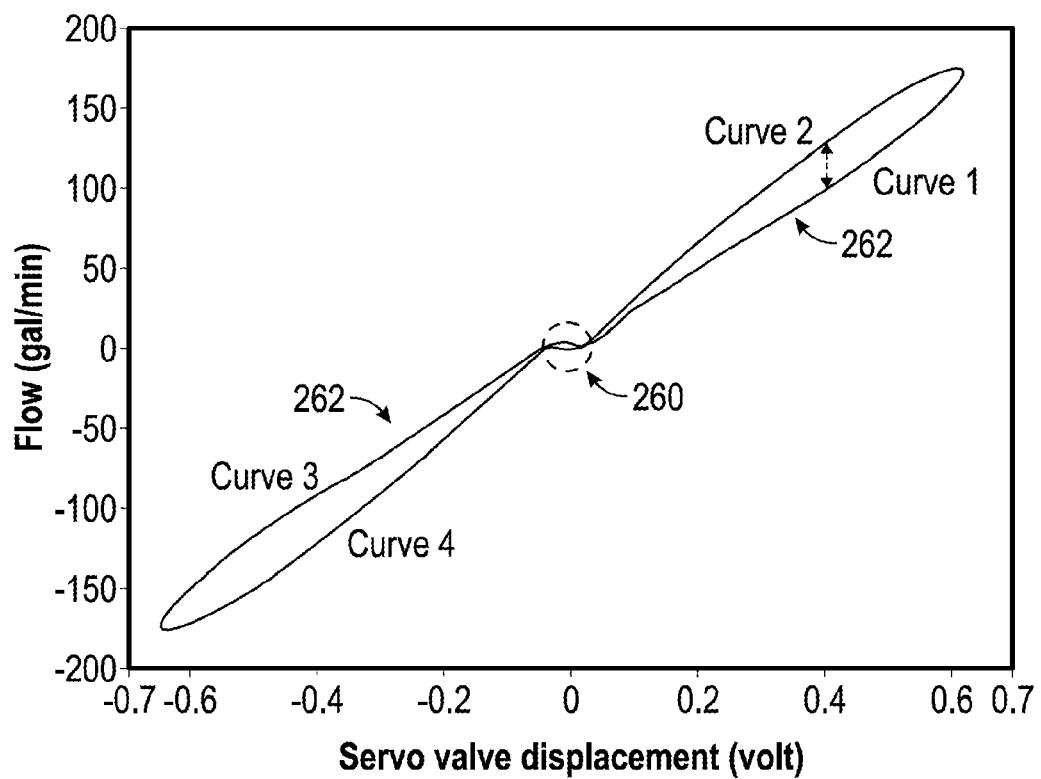
FIG. 4 is a graph illustrating a flow gain response of a conventional servo-valve.

FIG. 4 serves as an example to demonstrate these nonlinearities. These nonlinearities can be clearly illustrated through the servo-valve flow-gain response to the servo-valve displacement or opening. The horizontal axis represents the servo-valve displacement in voltage unit. The vertical axis is the flow in the unit of gallon per minute. This flow was calculated using the relative reaction-mass velocity multiplied by the piston area. At the point or region of zero valve displacement or null 260, it should be noted that the flow rate versus displacement relationship, shown by line 262, becomes non-linear. Specifically, displacement of the servo-valve does not result in a corresponding change in flow. A desirable flow gain response at null 260 is a linear response, or a generally straight line, through the null 260.

Figure 5:
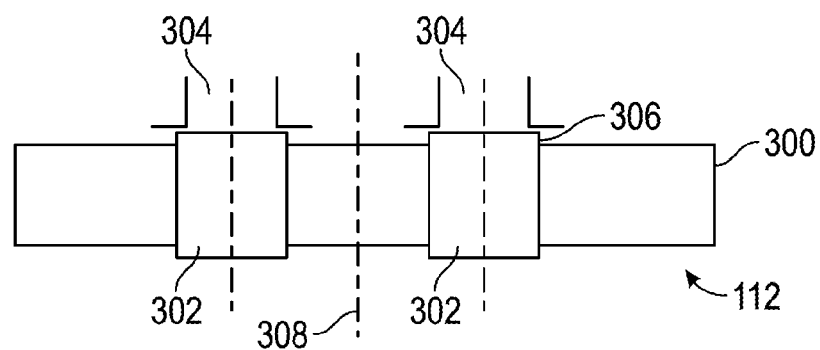
FIG. 5 schematically illustrates a spool of a conventional servo-valve.

Some factors that may introduce nonlinearities may be shown in FIG. 5, which schematically illustrates a spool 300 of the servo-valve assembly 112. Often, the lands 302 of the spool have a small amount of overlap with the flow path 304, which may be channels or orifices that convey oil. The overlap region 306 appears in the flow gain response at the area of the zero origin or null 260 (FIG. 5) as a flow-gain nonlinearity. This means that there are no flow outputs in this region even though the spool 300 of the servo-valve 112 is moving moves. Moreover, the overlap region 306 may not be symmetrical across the vertical zero line 308. For instance, the spool 300 of the servo-valve 112 may be slightly offset relative to the zero line 308. This offset may cause the lands 302 of the servo-valve 112 to have more overlap on one side than the other. Moreover, this could cause the flow output from the servo-valve to have an overlap at one side while the other side is in the under-lap; i.e., a gap in the valve body allows fluid flow. The under-lap allows fluid movement to occur before a servo-valve displacement.

Figure 6:
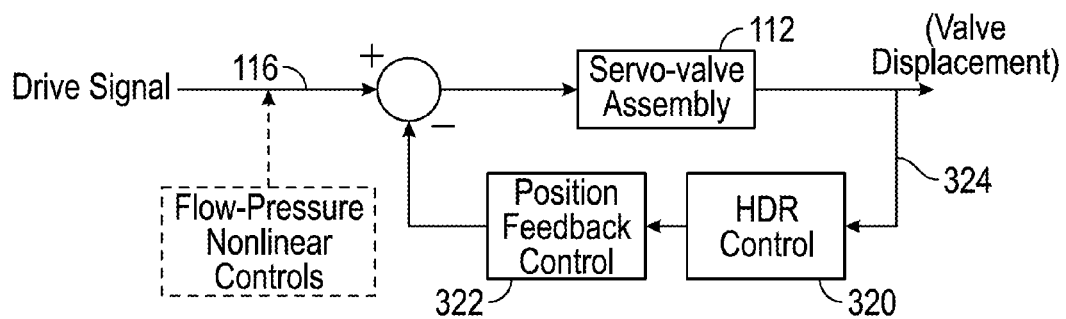
FIG. 6 is a schematic block diagram of one embodiment of a control system that reduces nonlinearities in a conventional servo-valve.

Referring now to FIG. 6, there is shown a block diagram of one non-limiting implementation of a harmonic distortion reduction (HDR) system 320 that linearizes the flow gain behavior of a servo-valve assembly 112. In aspects, the HDR control system 320 uses nonlinear control algorithms to linearize the above-described flow gain nonlinearities in the servo-valve system 112. In one embodiment, the HDR control 320 may include a circuit, processor, or other device that is configured or programmed to generate a position feedback control signal 322 that functions as a negative feedback for the control signal 116 being fed to the servo-valve assembly 112.

Figure 7:
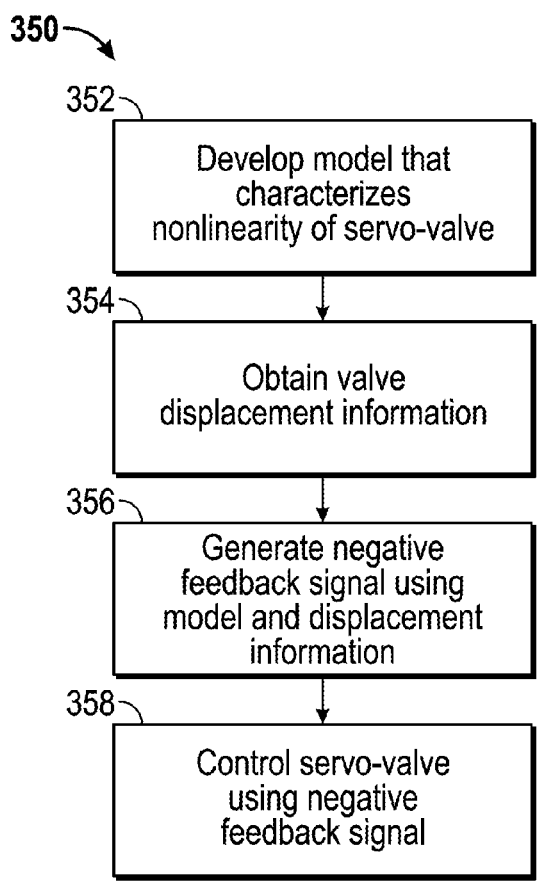
FIG. 7 is a flow chart depicting one exemplary method for reducing nonlinearities in a conventional servo-valve.

In some embodiments, the flow-gain response behavior may be modeled as curves using experimental and/or historical data. These may be considered predetermined computer models that may be used by algorithms programmed into the control system 320. In other embodiments, a model of flow-gain response may be developed by operating the vibratory seismic signal source 200 (FIG. 2) for a period of time to collect the flow rate and spool displacement data. In still other embodiments, the model of flow-gain response may be dynamically updated during operation of the vibratory seismic signal source 200 (FIG. 2). That is, the system 320 may periodically or continually determine the response of the servo-valve 112 to the negative feedback and make adjustments to minimize the nonlinearity at null 360 (FIG. 7). In addition to having a flow-gain curve, parameters such as overlap width and the coordination of the start and end points may be predetermined as well.

The HDR control 320 may receive servo-valve displacement information directly or indirectly. For example, the servo-valve assembly 112 may include one or more sensors (not shown) that directly estimate or determine the displacement of the servo-valve 112 and transmit displacement measurements 324 to the HDR control 320. For instance, a Linear Variable Differential Transformer (LVDT) transducer (not shown) may measure the displacement of the spool 300 (FIG. 5). In other embodiments, indirect measurements of servo-valve displacement may be used. For instance, displacement sensors may be used to measure the movement of the reaction mass 204 (FIG. 2). Signals representative of this movement may be sent as the signals 324 to the HDR Control 320.

The control architecture for minimizing the nonlinearity at null may be incorporated into any of the subsystems of the seismic source 100 (FIG. 1). In one embodiment, the HDR control 320 may include a processor programmed with algorithms that use flow-gain models to generate a feed back control signal 322. The HDR control 320 and/or the model(s) may be integrated into the controller 108 (FIG. 1) or on a portable laptop computer (not shown) that is data communication with the controller 108 (FIG. 1). Thus, the negative feedback signals may be generated locally and/or a remote location. In still other embodiments, the HDR control 320 and/or model(s) may reside outside of the geographical location in which the seismic survey is being taken, such as at a central office that uses satellite communications to interact with the controller b108 (FIG. 1). Further, it should be understood that the processing activities may be split or divided between two or more processors. For example, a local processor may provide a feed back control signal and a remote processor may dynamically update the models used to generate the feedback control signal.

While the HDR system 320 has been described as using a processor to generate a negative feedback signal, it should be appreciated that an analog electrical circuit may also be used to generate a feedback signal in response to a suitable input (e.g., sensor signals indicative of servo-valve displacement).

Referring now to FIG. 7, there is shown one illustrative method 350 for reducing harmonic distortions according to the present disclosure. At step 352, a flow gain model of the servo-valve 116 (FIG. 2) that characterizes the nonlinearities is developed. At step 354, displacement information for the servo-valve is obtained while the servo-valve 116 is controlling movement of a reaction mass 204 (FIG. 2). At step 356, an algorithm uses the flow gain model and the displacement information to generate a negative feedback signal that will reduce the nonlinear behavior of the servo-valve 116 (FIG. 2) in the vicinity of the null 260 (FIG. 4). At step 358, the negative feedback signal is fed into servo-valve closed position control loop.

Figure 8:
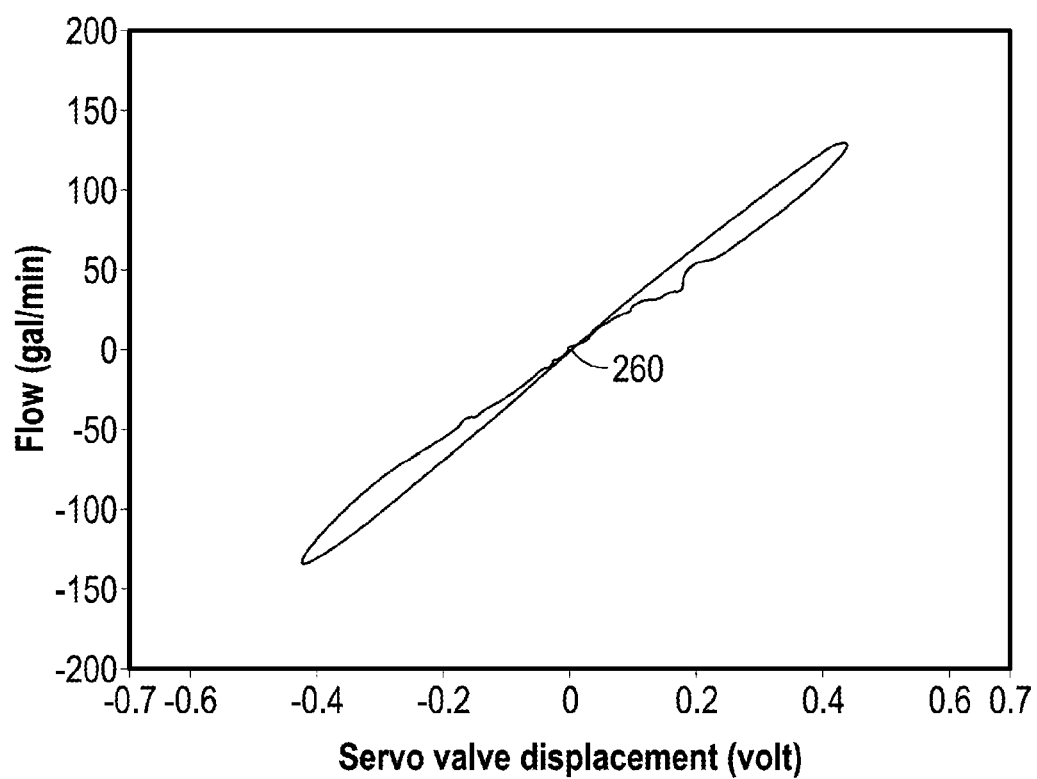
FIG. 8 is a graph illustrating a flow gain response of a conventional servo-valve that is controlled using the control system of FIG. 7.

FIG. 8 shows an exemplary servo-valve flow-gain response to a servo-valve displacement while HDR control is being implemented. As should be appreciated, the nonlinear region is almost eliminated and the flow-gain curve at the area near null 360, or zero origin, is linearized and more resembles a straight line. It should be understood that the terms "linearized" or "reducing a nonlinearity" are not intended to require mathematical precise linearity. Rather, these terms are intended to refer to behavior that is sufficiently linear to reduce harmonic distortion below a level that impairs the usefulness of acquired seismic data.

It should be understood that the harmonic distortion reduction techniques of the present disclosure may also be used in conjunction with other harmonic distortion reduction techniques. For example, referring to FIG. 6, in addition to compensation for nonlinear behavior at null due to factors such as overlap and offset, a flow-pressure nonlinear control may be used to address addition nonlinearities discussed in U.S. Pat. No. 7,929,380, which is hereby incorporated by reference for all purposes.

While the present disclosure referred primarily to a vibrator truck, it should be appreciated that the present teachings may also be applied to other seismic sources. For example, another illustrative energy source is an accelerated weight-drop truck. A weight-drop truck is a vehicle mounted ground impact which can used to provide the seismic source. A heavy weight is raised by a hoist at the back of the truck and dropped, possibly about three meters, to impact (or "thump") the ground. To augment the signal, the weight may be dropped more than once at the same spot, the signal may also be increased by thumping at several nearby places in an array whose dimensions may be chosen to enhance the seismic signal by spatial filtering.

Also, the present teachings referred primarily to a servo-valve as a controllable valve. It should be understood that any valve susceptible to nonlinear behavior may benefit from the control systems and methods of the present disclosure. In the same vein, the present teachings may be used on controllable valves that control devices other than seismic sources.

In aspects, the present disclosure also includes methods for creating the model of valve behavior that may be used to control valve operation. For example, one or more selected sweeps may be used to create one or more models of the valve response at varying drive levels and frequencies. Illustrative sweep types include, but are not limited to, to monochromatic, up, down, linear, nonlinear, and random sweep. These sweeps may be used to generate information such as that illustrated in FIGS. 4 and 8. Thereafter, a model may be created using known techniques (e.g., polynomial, etc.) that may be used in the control algorithm to predict valve response.

Portions of the present disclosure pertaining to "software aspects" of the disclosure are used herein. These aspects include detailed description and claims in terms of logic, software or software implemented aspects typically encoded on a variety of media including, but not limited to, computer-readable media, machine-readable media, program storage media, or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The term "information processing device," "processor," "computer," or "controller" as used herein includes, but is not limited to, any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

The invention claimed is:

1. A seismic source signal apparatus for generating a seismic source signal, the apparatus comprising:
  a seismic source component for coupling a reaction mass to the earth;
  a controllable valve operatively connected to the seismic source component, the controllable valve including a spool;
  a displacement sensor configured to estimate a parameter relating to a position of the spool; and
  a controller controlling the controllable valve with a primary control signal generated by using a model of a response of the controllable valve over a selected operating range, wherein the model is configured to reduce a nonlinearity in flow versus displacement response of the controllable valve, wherein the nonlinearity occurs at a null point at a region of zero valve displacement, and wherein the primary control signal is based at least partially on a relationship defined by:

$$Q_L = KX_V \sqrt{P_s - \frac{X_V}{|X_V|} P_L}$$

where:
  Q=Hydraulic flow through the servo valve;
  K=Hydraulic flow gain;
  $X_V$=Servo Valve displacement;
  $P_S$=Hydraulic fluid supply pressure, which comprises $P_H$–$P_R$; and
  $P_L$=Hydraulic differential pressure, which comprises control pressures $P_A$–$P_B$,
  wherein the model is based at least on information relating to a relationship between flow rate and valve displacement.

2. A method for generating seismic signals with a seismic source that is operatively connected to a controllable valve, comprising:
  generating a primary control signal using a processor, wherein the processor includes a model of a response of the controllable valve over a selected operating range, wherein processor uses the model to reduce a nonlinearity in flow versus displacement response of the controllable valve, wherein the non-linearity is a variance from a linear flow-to-displacement relationship that occurs at a null point at a region of zero valve displacement; and transmitting the primary control signal to the controllable valve to generate the seismic signals with the seismic source.

3. The method of claim 2, further comprising estimating a displacement of the controllable valve, and using the estimated displacement and the model to generate the primary control signal.

4. The method of claim 2, wherein the controllable valve is a servo-valve that includes a spool, and wherein the nonlinearity is at least partially associated with an offset of the spool relative to a nominal center; and further comprising reducing the non-linearity at the nominal center using the model.

5. The method of claim 2, further comprising estimating a displacement of the spool, and using the estimated displacement as a negative feedback to generate the primary control signal.

6. The method of claim 2, wherein the model uses a slope of a curve of the flow versus valve displacement to generate the primary control signal.

7. The method of claim 2, wherein the operating range is less than twenty hertz.

8. The method of claim 2, wherein the primary control signal is based at least partially on a relationship defined by:

$$Q_L = KX_V \sqrt{P_s - \frac{X_V}{|X_V|} P_L}$$

where:
Q=Hydraulic flow through the servo valve;
K=Hydraulic flow gain;
$X_v$=Servo Valve displacement;
$P_S$=Hydraulic fluid supply pressure, which comprises $P_H$-$P_R$; and
$P_L$=Hydraulic differential pressure, which comprises control pressures $P_A$-$P_B$.

9. The method of claim 2, further comprising dynamically updating the model while generating the seismic signals with the seismic source.

10. The method of claim 2, further comprising using a control algorithm to control the controllable valve, and wherein the processor adjusts the control algorithm using the model.

11. The method of claim 2, further comprising: configuring the model of the response of the controllable valve over the selected operating range to include to include a first curve, a second curve, a third curve, and a fourth curve, wherein the non-linearity joins the first curve and the second curve with the third curve and the fourth curve.

12. A seismic source signal apparatus for generating a seismic source signal, the apparatus comprising:
a seismic source component for coupling a reaction mass to the earth;
a controllable valve operatively connected to the seismic source component; and
a controller controlling the controllable valve with a primary control signal generated by using a model of a response of the controllable valve over a selected operating range, wherein the model is used to reduce a nonlinearity in flow versus displacement response of the controllable valve, and wherein the non-linearity is a variance from a linear flow-to-displacement relationship that occurs at a null point at a region of zero valve displacement.

13. The apparatus of claim 12, further comprising a displacement sensor configured to transmit information relating to a position of a spool associated with the controllable valve to the controller.

14. The apparatus of claim 13, wherein the model is based at least on information relating to a relationship between flow rate and valve displacement and wherein the relationship is represented by a first curve, a second curve, a third curve, and a fourth curve, wherein the non-linearity joins the first curve and the second curve with the third curve and the fourth curve.

15. The apparatus of claim 12, wherein the controller is configured to dynamically update the model.

16. The apparatus of claim 12, wherein the controller is configured to estimate a displacement of the spool and use the estimated displacement to generate a negative feedback.

17. The apparatus of claim 12, wherein the model is at one of: (i) a processor located at the seismic source, (ii) in a computer proximate to the seismic source, and (iii) a processor at a remote location.

18. The apparatus of claim 12, wherein the controller is one of: (i) a programmable processor, and (ii) an analog electrical circuit.

19. The apparatus of claim 12, further comprising using a control algorithm controlling the controllable valve, and wherein the controller adjusts the control algorithm using the model.

* * * * *